CONTROLLING MAGNETIC SOUND RECORDING AND REPRODUCING DEVICES

Filed June 3, 1957

Inventor:

Werner Zorn 2,971,762

CONTROLLING MAGNETIC SOUND RECORDING AND REPRODUCING DEVICES

Werner Zorn, Schillerstrasse 5, Berlin-Zehlendorf-West, Germany

Filed June 3, 1957, Ser. No. 663,310

Claims priority, application Germany June 5, 1956

4 Claims. (Cl. 274—4)

Figure 1:
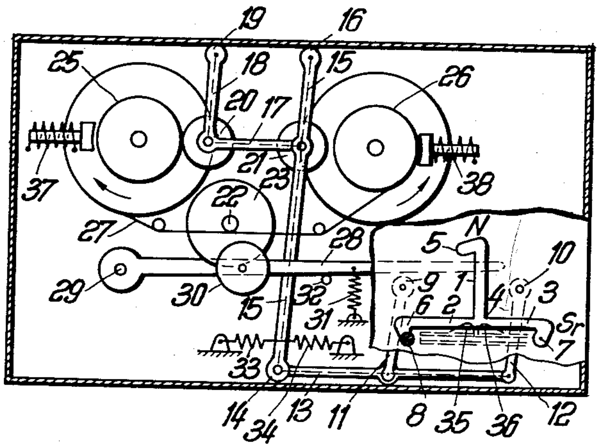

With magnetic sound recording and reproducing devices now used, in particular, magnetic tape recorders, rotary or push button or push keys are mostly used to switch over the recording carrier to the various speeds or to the various directions of movement. It has already been suggested that, instead of these push buttons or keys, a single moveable lever be provided in the form of a control arm and this, when moved into one of the positions arranged on a plane, would then transmit the control movements necessary for altering the operational conditions. For this purpose, one or more slot-guides are provided for this lever on the control panel of the recording device allowing the lever to be moved into the desired position: "tape movement to the left" when moved to the left into this position or to the right into the position "tape movement to the right" or into other positions such as, for example, "high speed to the left" or "high speed to the right" or "stop." This suggestion also proposed providing spring stops at the ends of the slot-guides to keep the control lever in the positions.

The present invention refers to a further improvement of the type last mentioned for recording and reproducing devices: According to the invention, the direction of the guideways for the lever is altered at the positions provided for the lever. This means that the various positions of the control lever are definitely fixed by mechanical means.

The invention provides several methods for the alterations in the direction of the guideways. One method is the provision of additional grooves at the side, the control lever being moved into these when taking up its respective operational position. These grooves are formed in such a way that the stop position of the control lever in these grooves is nearer to the base of a spring constantly drawing the control lever to the centre point of its possible position than to the entrance of the groove. The guideway grooves are, therefore, either arranged at acute angles to the normal guideways or are given a round or oval form.

According to another method, the guideway deviations can consist of bends, i.e. for the control lever position: "stop." A variation on this is for the guideways to have a zig-zag course or one resembling a flash of lightning in the vicinity of the control lever position "stop." One of the two ends of this part of the guideway forming an acute angle with the guideway or, as the case may be, both these ends can be formed as stop positions, in particular for the position "stop."

A device according to the invention also makes possible the determination of the braking operations of the control lever movement so that—in particular when stopping at high speed—a definite sequence is attained in applying the brake to the run-off spool on the one hand and the run-on spool on the other hand.

There are several basic methods possible for carrying out the invention and these are explained in the appendixed drawing by means of examples.

Figures 1 to 6 of the drawing show the basic arrangement of the guideways for the control lever. The simplest method is to arrange these guideways as slots in the top plate of the casing with the operating handle projecting out of them, this handle being on the actual control lever or connected to it.

As well as a basic arrangement for the guideways of the control lever, Fig. 1 also shows—in particular, embodied in parts 1 to 7—a basic arrangement for construction of those parts of the magnetic recording device operated by the control lever for obtaining the various operational conditions. These parts are mostly represented with the top plate of the set removed with the exception of the part of this plate at the bottom of the right hand side, shown in Fig. 1 by dotted lines, containing in particular the slot guides for the control lever. These guideways for the control lever consist of slots 1, 2 and 3 in the top plate, best arranged in the form of an inverted T. Here the top point of the guideways—from the standpoint of the user—is fixed for the operational position normal speed: "N," with the ends of the sections of the guideway 2 and 3 fixed for high speed to the left: "$S_l$" and for high speed to the right: "$S_r$." This presupposes a magnetic recording device using a single-track tape only, with the direction of the tape for normal speed (recording or reproduction) always the same, however possible in both directions at high speed.

The alterations in direction shown in guideways 1 to 3 serving to fix the various positions of the control lever are given the shape of additional grooves forming acute angles with the main section, groove 5 for the position "N," groove 6 for position "$S_l$" and groove 7 for the position "$S_r$." Finally, the bend shown at 4 is provided for the operational position stop: "H."

The user now puts the operating handle, marked with 8, of the control lever into one of the angular grooves 5, 6 or 7 so that the position of the control lever is exactly fixed for the operational condition in question and the lever cannot move of its own from this position. When switching to position "H," provision is made for the control lever 8 to lie in the bend 4 which can easily be found by the stop action, independent as to whether the control lever 8 comes to the bend 4 from the section of the guideway 1, 2 or 3.

The end of the control lever 8 away from the operating handle is fitted inside the set and can move in several directions. It is also coupled in a suitable manner with the control devices causing the various tape movements. Such a construction is described, for example, in Fig. 9 of the earlier German patent application L 22.489 VIIId/42g. In order to keep the control lever 8 securely in its respective position in one of the grooves 5, 6 or 7, the invention has to provide for the base of a spring—for example, the spring 79 in the above-mentioned Fig. 9 of the earlier German application—to be arranged relative to the stop positions of the control lever in the grooves so that it is nearer to these stop positions than to the entrance of the respective grooves.

The following means are provided for transmitting the movements of the control lever 8 to the respective gear parts: Two levers 11 and 12 are pivoted at points 9 and 10. A rod 13 is flexibly fixed on the ends of these levers and in turn is flexibly coupled at point 14 to a lever 15 the end of which is pivoted at 16. Another rod 17 and a lever 18 flexibly coupled to this, 18 being pivoted at 19, are also fixed to the lever 15 so that levers 15 and 18 can be moved in parallel ways. Coupling discs 20 and 21 are provided at a suitable position, e.g. at the two ends of the rod 17 and these directly drive either—as shown in Figure 1—the spool disc 25 or when the direction of the tape is reversed, the spool disc 26 in the direction shown by the curved arrows. The means of coupling between the motor shaft and the discs 20 and 21 are omitted in the aims of clarity. A magnetic recording tape 27 can be moved between the tape spools on the spool discs 25 and 26. The magnetic recording heads are also not shown.

The coupling levers 11 and 12 are moved by means of the control lever 8 being brought into the slots 2 and 3 either, as shown, to the left ($S_l$) or, when the control lever 8 is brought to the end of slot 3 to position $S_r$, to the right. In the latter case, the control lever 8 presses against the coupling lever 12 and so moves the rod 13, the levers 15 and 18 etc. into the position where the coupling disc 21 rests on the spool 26.

In order to switch over to the operational condition normal speed "N," the control lever 8 is moved upwards through the slot 1 and presses a lever 28 pivoted at 29 against the force of a tension spring 31 upwards so that an attach disc 30 on lever 28 is pressed against the synchronous disc 22 driving the tape 27. This synchronous disc 22 is provided in the usual way with a flywheel 23. When lever 8 is moved downwards again from position "N," the free end of lever 28 moves downwards under the force of the tension spring 31 up to the stop 32. With the control lever 8 in slot 1, lever 15 takes up a central position under the force of two equally large tension springs 33 and 34 which exert force on the lever from different directions. Here neither coupling disc 20 nor coupling disc 21 rest on the respective spool, i.e. 25 or 26. The spools are turned in this case, i.e. at normal speed, by a friction coupling of normal type not shown here.

When switching to the position "stop," it is best to provide for the run-off spool to be braked first and immediately afterwards the run-on spool. This is particularly necessary when the spools are braked at high speed. The following additional means are provided by the invention to carry out this fixed braking sequence: Contact feelers 35 and 36 are fitted within the range of movement of the control lever 8 in the slots 2 and 3. When the control lever 8 is brought past them, they are pressed to the side and each closes a circuit contact. The circuit contact on feeler 35 is in the circuit of a brake magnet 37 resting on the spool disc 25, and the contact of feeler 36 is connected with a circuit of a brake magnet 38. If, for example, the control lever 8 is moved out of its position high speed left, as shown in Figure 1, from the end 6 of slit 2 towards point 4, brake magnet 37 is operated first and then shortly afterwards brake magnet 38 by the depression of the feelers 35 and 36. This means that the run-off tape spool is always braked prior to the run-on spool so that loop formation in the tape is successfully avoided.

The angular grooves 5, 6, 7, shown in Fig. 1, can, if required, be replaced by circular or oval ones.

Figure 2:
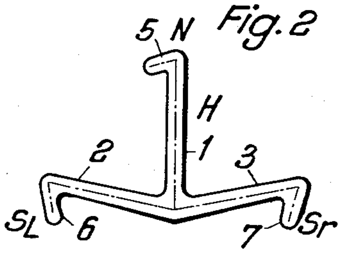
Figure 3:
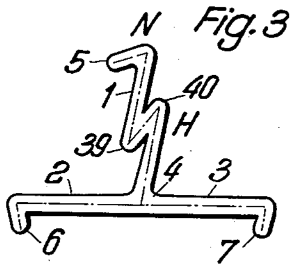
Figure 4:
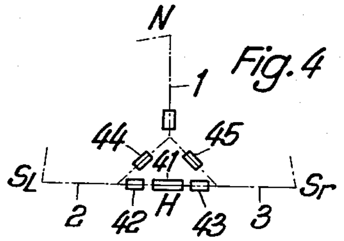

Figures 2 to 4 deal with further types of the guideways. They deviate somewhat from the arrangement in Fig. 1 and correspondingly cause certain alterations in the mechanical control parts without, however, infringing on the basic operational principle:

The arrangement in Fig. 2 mainly differs from that of Fig. 1 in that position "H" is arranged in the vertical part of the guideway leading to position "N" instead of in the bend 4.

Starting from the arrangement as in Figure 2, Fig. 3 has a varied arrangement of the guideway at position "H." Here the guideway is made zig-zag, i.e. in the form of a stroke of lightning. This makes it possible to come to a stop point 39 on reaching position "H" from position "N" and, when moving from position 4, i.e. from high speed, the stop 40 is reached. With an arrangement according to Fig. 3, the zone in which the control means for the position "stop" can be operated can be extended, if desired, over the whole guideway between the position "N" and the point 39 and between point 40 and point 4. The actual "stop" positions, in particular from high speed, for Figs. 2 and 3 can also be provided with the braking means or contact means for this shown in Fig. 1 with 35 to 38.

Figure 5:
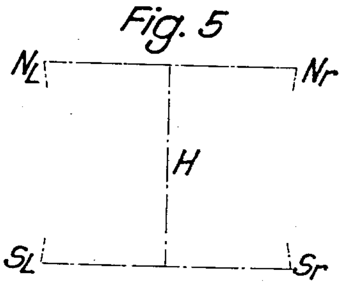
Figure 6:
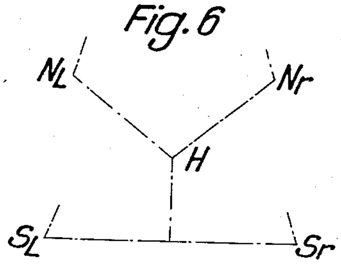

Figs. 4 to 6 show—in diagrammatic form—further basic solutions within the framework of the invention.

Fig. 4 has a further control variation for the braking sequence. Here the separate guideways 1 to 3 are analogous to the other arrangements as in Fig. 1, but point 4 is widened out to a triangular slot 41 with the separate guideways 1, 2 and 3 connected at its corners. In guideway 1 and in the base of the triangle 41, zones are provided for a complete "stop" position. Brake control means 42 and 43 (corresponding to parts 35 and 36 in Fig. 1) are now provided at both sides of this "stop" position in the base of the triangle 41. Further means of this kind are best arranged on the sides of the triangle and are represented with 44 and 45. Such an arrangement allows for a whole series of possible adjustments: The prior braking of the run-off spool is, in this case, not only carried out from one of the high speed positions "$S_l$" or "$S_r$" into the "stop" position but also from high speed to normal speed. Here the control lever 8 is moved along one of the sides of the triangle.

The guideways in Fig. 4 do not need to be straight as shown in the diagram. They can also be made bent. This is especially recommended for the sides of the triangle 41.

The arrangements in Figs. 1 to 4, which can also be further varied, are applicable only to sets with single-track magnetic recording tapes with only one tape direction for normal speed. The guideways shown in Figs. 5 and 6 can, however, be used with sets having multitrack tapes and consequently two different directions of movement at normal speed. In such cases, it is best to arrange the whole guideway in the form of an H on its side. One of the horizontal beams forms at its ends the position normal speed left: "$N_l$," the other the position normal speed right: "$N_r$." The other horizontal beam is provided for the two high speed positions "$S_l$" and "$S_r$" as in Figs. 1 to 4. The vertical beam of the guideways is there mainly for the position Stop, extending, for example, over the whole length of this vertical beam as is the case in Fig. 5.

In this basic arrangement of the guideways for multitrack devices, one horizontal beam can have a bend 4 as shown in Fig. 6.

In a manner analogous to Figs. 1 to 4, the guideway arrangements in Figs. 5 and 6 can be provided with control zones at both sides of the position "stop" so that the run-off spool can be braked first.

What I claim is:

1. A magnetic tape apparatus for recording and/or reproducing sound with a motor-driven mechanism for performing different tape speeds and tape directions, said apparatus containing the following parts: a case, tape spool discs arranged on the upper wall of said case, a first slot lying rectangularly to the connecting line between the axes of said tape spool discs provided in said upper wall, a second slot in said upper wall lying rectangularly to said first slot and forming a T with it, a control lever one end of which is pivotally mounted within said case, the other end of said control lever projecting through said slots is movable by user's hand along said slots, two turnable levers, one end of each being pivotally mounted on an axis arranged rectangularly to said upper wall of said case, and the free ends of said turnable levers being arranged near the ends of said second slot, a rod connecting said free ends of said two levers with each other, a third turnable lever one end of which is pivotally mounted on an axis arranged rectangularly to said upper wall of said case and the free end of which is pivotally connected with said rod, said third lever carrying at least one coupling disc coupled with said driving motor and adapted to be frictionally applied to the periphery of one of said spool discs for performing "rapid speed,"

said two turnable levers, said rod and said third turnable lever being arranged in such a manner that by shifting said control lever into one of the ends of said second slot one of said two turnable levers together with said rod and said third turnable lever is shifted into a position in which said coupling disc is applied to one of said spool discs for performing "rapid speed left" or "rapid speed right," and a fourth turntable lever lying about rectangularly to said first slot and carrying an attach disc adapted to be applied to a tape capstan, one end of said fourth turnable lever being pivotally mounted on an axis arranged rectangularly to said upper wall of said case, and the free end of it being arranged near one end of said first slot in such a manner that by shifting said control lever into said slot end for performing "normal speed," said fourth turnable lever is shifted into a position in which said attach disc is applied to said tape capstan.

2. An apparatus according to claim 1, in which said two turnable levers and said third turnable lever are arranged parallel to each other.

3. An apparatus according to claim 2, in which an additional turnable lever is pivotally mounted on an axis arranged rectangularly to said upper wall of said case, the free end of said additional turnable lever being pivotally connected with a second rod the free end of which is pivotally mounted on said third turnable lever, one of said coupling discs being arranged on said additional turnable lever.

4. An apparatus according to claim 1, in which one end of said first slot is continued into two single slots, and the control lever is movable into each of the ends of said single slots for performing "normal speed left" and "normal speed right."

References Cited in the file of this patent

UNITED STATES PATENTS

| | | |
|---|---|---|
| 2,555,643 | Harrison | June 5, 1951 |
| 2,712,448 | Schroter | July 5, 1955 |

FOREIGN PATENTS

| | | |
|---|---|---|
| 1,024,985 | France | Apr. 9, 1953 |